United States Patent
Kang

(10) Patent No.: US 9,959,139 B2
(45) Date of Patent: *May 1, 2018

(54) PARTITIONING PROCESSES ACROSS CLUSTERS BY PROCESS TYPE TO OPTIMIZE USE OF CLUSTER SPECIFIC CONFIGURATIONS

(71) Applicant: NeoDana, Inc., Palo Alto, CA (US)

(72) Inventor: Dan C. Kang, Palo Alto, CA (US)

(73) Assignee: Dan C. Kang, Palo Alto, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/261,615

(22) Filed: Sep. 9, 2016

(65) Prior Publication Data

US 2016/0378538 A1    Dec. 29, 2016

Related U.S. Application Data

(63) Continuation of application No. 13/732,143, filed on Dec. 31, 2012, now Pat. No. 9,477,524, which is a
(Continued)

(51) Int. Cl.
*G06F 9/50* (2006.01)
*G06F 9/455* (2018.01)
(Continued)

(52) U.S. Cl.
CPC .............. *G06F 9/50* (2013.01); *G06F 9/455* (2013.01); *G06F 9/45533* (2013.01);
(Continued)

(58) Field of Classification Search
None
See application file for complete search history.

(56) References Cited

U.S. PATENT DOCUMENTS

| | | | |
|---|---|---|---|
| 7,937,447 B1 | 5/2011 | Cohen et al. | |
| 7,996,346 B2 | 8/2011 | Bell et al. | |

(Continued)

FOREIGN PATENT DOCUMENTS

| | | |
|---|---|---|
| TW | 200945206 | 11/2009 |
| TW | 201019132 | 5/2010 |

OTHER PUBLICATIONS

International Application No. PCT/US2011/042866, International Search Report and Written Opinion dated Dec. 15, 2011.
(Continued)

*Primary Examiner* — Charles M Swift
(74) *Attorney, Agent, or Firm* — Sheppard, Mullin, Richter & Hampton LLP

(57) ABSTRACT

A system and method for virtualization and cloud security are disclosed. According to one embodiment, a system comprises a first multi-core processing cluster and a second multi-core processing cluster in communication with a network interface card and software instructions. When the software instructions are executed by the second multi-core processing cluster they cause the second multi-core processing cluster to receive a request for a service, create a new or invoke an existing virtual machine to service the request, and return a desired result indicative of successful completion of the service to the first multi-core processing cluster.

20 Claims, 6 Drawing Sheets

Related U.S. Application Data continuation-in-part of application No. PCT/US2011/042866, filed on Jul. 1, 2011.

(60) Provisional application No. 61/360,658, filed on Jul. 1, 2010.

(51) Int. Cl.

| | |
|---|---|
| *G06F 9/48* | (2006.01) |
| *G06F 21/53* | (2013.01) |
| *G06F 21/62* | (2013.01) |
| *H04L 29/06* | (2006.01) |

(52) U.S. Cl.
CPC ............ *G06F 9/45558* (2013.01); *G06F 9/48* (2013.01); *G06F 9/4881* (2013.01); *G06F 9/5005* (2013.01); *G06F 9/5011* (2013.01); *G06F 9/5027* (2013.01); *G06F 9/5044* (2013.01); *G06F 9/5055* (2013.01); *G06F 9/5061* (2013.01); *G06F 9/5077* (2013.01); *G06F 9/5083* (2013.01); *G06F 9/5088* (2013.01); *G06F 21/53* (2013.01); *G06F 21/6218* (2013.01); *H04L 63/0227* (2013.01); *H04L 63/0428* (2013.01); *H04L 63/14* (2013.01); *G06F 2009/4557* (2013.01); *G06F 2009/45579* (2013.01); *G06F 2009/45583* (2013.01); *G06F 2009/45587* (2013.01); *G06F 2009/45595* (2013.01); *G06F 2221/2149* (2013.01); *Y02B 60/146* (2013.01); *Y02B 60/148* (2013.01)

(56) References Cited

U.S. PATENT DOCUMENTS

| | | | |
|---|---|---|---|
| 8,336,047 B2 | 12/2012 | Van Hensbergen | |
| 9,477,524 B2 * | 10/2016 | Kang | ............ G06F 21/53 |
| 2005/0021772 A1 | 1/2005 | Shedrinsky | |
| 2006/0026275 A1 | 2/2006 | Gilmour et al. | |
| 2006/0070066 A1 | 3/2006 | Grobman | |
| 2006/0112227 A1 | 5/2006 | Hady et al. | |
| 2009/0112972 A1 | 4/2009 | Liu | |
| 2009/0113420 A1 | 4/2009 | Pawlowski | |
| 2009/0150550 A1 | 6/2009 | Barreto et al. | |
| 2009/0177514 A1 | 7/2009 | Hudis et al. | |
| 2009/0210874 A1 | 8/2009 | Harris et al. | |
| 2010/0251363 A1 | 9/2010 | Todorovic | |
| 2011/0125854 A1 | 5/2011 | MacKen | |
| 2011/0126110 A1 | 5/2011 | Vilke et al. | |
| 2011/0185063 A1 | 7/2011 | Head et al. | |
| 2011/0213934 A1 | 9/2011 | Greenhalgh et al. | |
| 2011/0219225 A1 | 9/2011 | Yamazaki et al. | |
| 2011/0219372 A1 | 9/2011 | Agrawal et al. | |
| 2012/0110055 A1 | 5/2012 | Van Biljon et al. | |
| 2012/0117229 A1 | 5/2012 | Van Biljon et al. | |
| 2012/0284713 A1 | 11/2012 | Ostermeyer et al. | |
| 2012/0331468 A1 | 12/2012 | Bozek et al. | |
| 2013/0060839 A1 | 3/2013 | Van Biljon et al. | |
| 2013/0263132 A1 | 10/2013 | Colbert et al. | |
| 2013/0268580 A1 | 10/2013 | Vilke et al. | |
| 2013/0346479 A1 | 12/2013 | Vilke et al. | |

OTHER PUBLICATIONS

Taiwanese Patent Application No. 100123397, Office Action dated Jun. 23, 2014.

Krsul, Ivan et al. "VMPlants: Providing and Managing Virtual Machine Execution Environments for Grid Computing," Proceedings of the 2004 ACM/IEEE Conference on Supercomputing, Nov. 2004.

Trend Micro, Inc., "Making Virtual Machines Cloud Ready," white paper, Aug. 2009.

\* cited by examiner

PARTITIONING PROCESSES ACROSS CLUSTERS BY PROCESS TYPE TO OPTIMIZE USE OF CLUSTER SPECIFIC CONFIGURATIONS

CROSS-REFERENCE TO RELATED APPLICATIONS

This application is a continuation application of U.S. patent application Ser. No. 13/732,143, filed on Dec. 31, 2012, which is a continuation-in-part of PCT Patent Application No. PCT/US2011/042866, having an International Filing Date of Jul. 1, 2011, which claims the benefit of priority to U.S. Provisional Application No. 61/360,658, filed on Jul. 1, 2010, which are all hereby incorporated by reference.

FIELD

The present methods and system relate to computer systems, and more particularly, to process allocation among processor clusters.

BACKGROUND

Virtualization, in computing, is the creation of a virtual (rather than actual) version of something, such as a hardware platform, an operating system, a storage device or network resources. Virtualization is part of an overall trend in enterprise IT that includes autonomic computing, a scenario in which the IT environment will be able to manage itself based on perceived activity, and utility computing, in which computer processing power is seen as a utility that clients can pay for only as needed. The usual goal of virtualization is to centralize administrative tasks while improving scalability and workloads.

The aggregation of a large number of users using high speed personal computers, smart phones, tablet computers and intelligent mobile devices significantly increases required network packet processing performance in a non-virtualized and virtualized server of data center environment. Processing on each complicated packet from various mobile devices is necessary to differentiate and secure services. Green computing is becoming essential to limit power consumption. Also, shortened infrastructure deployment schedules can result in faster revenue generation.

Recent technology improvements can achieve the expected level of performance while providing a scalable solution with unrivalled performance in integration and power consumption ratio. Some of those included multi-core CPUs and hardware industry standards such as the AMC standard, the PCI Express standard, the Advanced TCA standard, and the Blade Center standard.

High performance software packet processing is typically required to efficiently implement the different protocols and ensure an adequate quality of service. Most advanced networks have adopted a class-based quality of service concept so they require per-packet processing for differentiating between packet services.

Traffic between a data center and remote users is often encrypted using IPSec and requires the assistance of hardware crypto engines. Multi-core technology provides necessary processing capabilities and offers a high level of integration with lower power consumption required by advanced networks. However, software design complexities persist, making development and integration difficult. The result is a hindrance to deployment of multi-core based solutions.

With virtualization and cloud computing gradually becoming more and more popular, existing servers can be logically grouped into a single, large pool of available resources. Aggregating the capacity of these devices into a single pool of available resources enables efficient utilization of servers which results in a related reduction in both capital and operational expenses. However, virtualization leaves traditional network security measures inadequate to protect against the emerging security threats in the virtual environment. This is due to a lack of major protection in the data path between servers and storage subsystems. The lack of protection prevents enterprises from experiencing the full benefits of a major data center transformation.

While cloud computing is often seen as increasing security risks and introducing new threat vectors, it also presents an exciting opportunity to improve security. Characteristics of clouds such as standardization, automation and increased visibility into the infrastructure can dramatically boost security levels. Running computing services in isolated domains, providing default encryption of data in motion and at rest, and controlling data through virtual storage have all become activities that can improve accountability and reduce the loss of data. In addition, automated provisioning and reclamation of hardened run-time images can reduce the attack surface and improve forensics.

SUMMARY

A system and method for virtualization and cloud security are disclosed. According to one embodiment, a system comprises a first multitasking multi-core processing cluster and a second real-time based identical or non-identical multi-core processing cluster in communication with network interface cards or via, for example, a PCI-e backplane and software instructions and interface mechanisms. When the software instructions are executed by the second multi-core processing cluster they cause the second multi-core processing cluster to receive a request for a service, create a new or invoke an existing software function to service the request, and return a desired result indicative of successful completion of the service to the first multi-core processing cluster.

BRIEF DESCRIPTION OF THE DRAWINGS

The accompanying drawings, which are included as part of the present specification, illustrate the presently preferred embodiment and, together with the general description given above and the detailed description of the preferred embodiment given below, serve to explain and teach the principles described herein.

Figure 1:
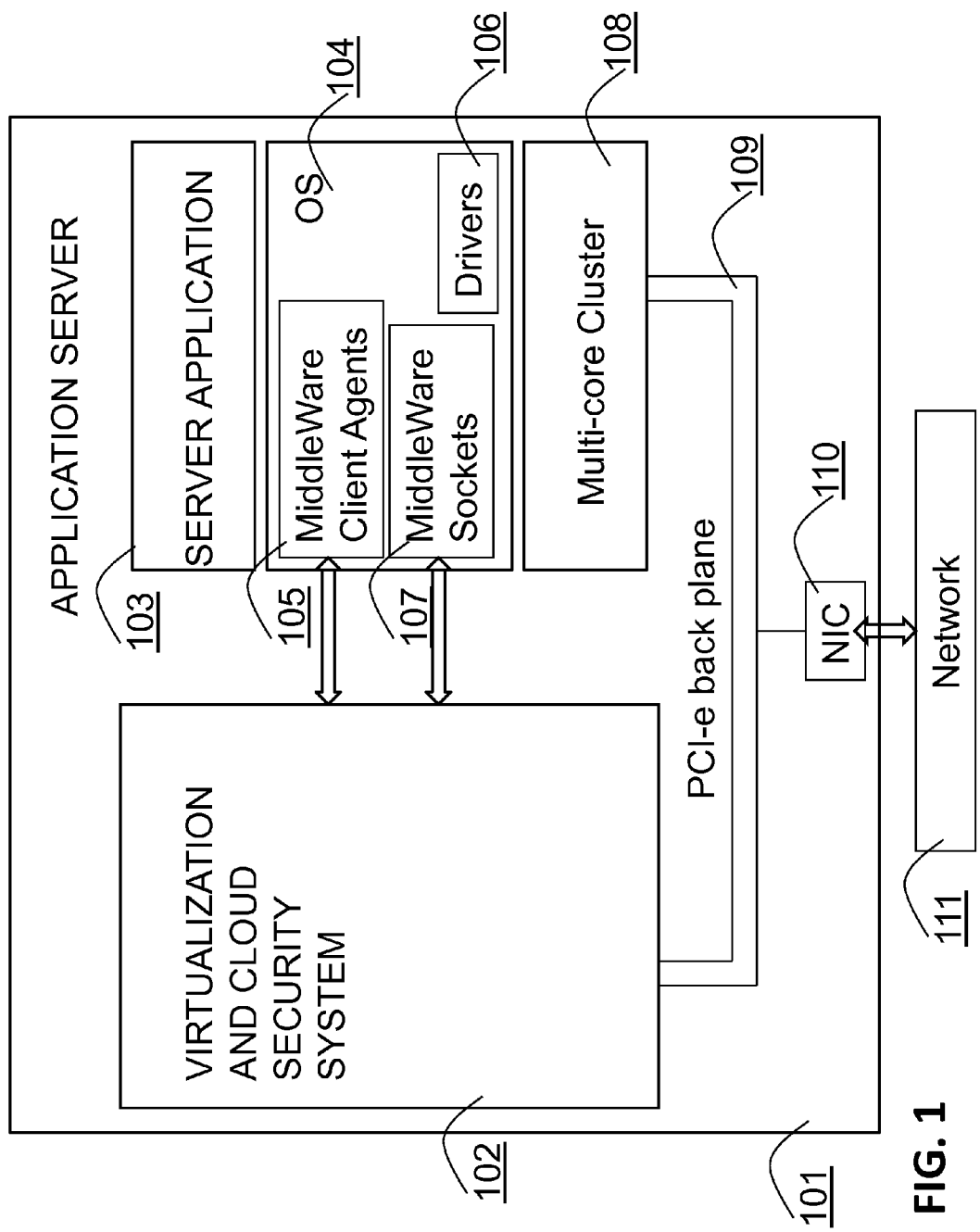
FIG. 1 illustrates an exemplary system level layout for use with the present system, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not describe every aspect of the teachings disclosed herein and do not limit the scope of the claims.

DETAILED DESCRIPTION

A system and method for virtualization and cloud security are disclosed. According to one embodiment, FIG. 1 illustrates a system (101) comprising a first multi-core processing cluster (108), which is controlled by multi-tasking OS (104) in communication with a network interface cards (110) or via PCI-e backplane (109) and software instructions(105) to the system (102) through interface. When the software instructions (105) are executed by the second non-identical or identical multi-core processing cluster (211) inside of system (102), which is controlled by real time operating system RTOS (213) inside of system (102), they cause the second non-identical or identical multi-core processing cluster (211) to receive a request for a service, create a new or invoke an existing software functions to service the request, and return a desired result through software instructions (107) and interface (110) or (109) indicative of successful completion of the service to the first multi-core processing cluster.

According to one embodiment, the present system provides an efficient implementation of fast path packet processing in control/data plane SW (212) to take advantage of the performance benefits provided by multi-core multiprocessing cluster (211). The present system includes a complete, comprehensive, and ready to use set of networking features including VLAN, Link Aggregation, GRE encapsulation, GTP and IP over IP tunneling, Layer 3 forwarding with virtual routing management, routing and virtual routing, Per Packet QoS (Quality-of-Service) and Filtering (ACLs) software functions in control/data plane SW (212), IPSec, SVTI, IKEv1 and IKEv2 for security functions in security SW (215). A more detailed description of SW(212) and SW(215) follows below.

According to one embodiment, the present system is fully integrated with a control/data plane SW (212) of operating system RTOS (213) for maximum reuse of software, simplified integration and hiding of multi-core design complexities. The present system (102)runs on multi-core platforms (211) with unified high-level APIs for interfacing with built-in services and functions in software (SW)(212) and hardware (HW) accelerators such as crypto engines or packet processing engines in multi-core cluster (211) and scales over different multi-core architectures, identical or non-identical as multi-core cluster (211) including low cost high volume hardware form factor, like PCI-e or ATCA configurations for enterprises and network equipment in data centers. The present system provides an open architecture to ease integration.

According to one embodiment, one aspect of the present system includes offloading network packet processing into control/data plane software stack SW (212) from application server (201) in a data center. Yet another aspect of the present system includes offloading additional security software stacks SW (215) to support security and other application functions from application server in data center. The third party UTM (Unified Threat Management) or Enterprise Security stacks can be integrated and being run on SW (215). The description of UTM and Enterprise security stacks are explained below.

According to one embodiment, a security software stack, UTM (Unified Threat Management) or Enterprise Security Stack is provided by third party vendors. In addition to security software stacks running on the system (102) transparently, there are security related functions that can be accelerated by a multi-core processing cluster (211) contained in a hardware blade described below.

According to one embodiment, another aspect of the present system includes providing virtualization security. A virtualization security platform, including combination of hardware multi-core cluster (211) and software platform, built-in on top of the hardware blades further described below, is the foundation of cloud computing security platform and includes additional software virtual machines running in system to offload network packet processing and security virtual machines from a virtualized server of system (101) into (102). The network packet processing and security functions are then, instead, handled by packet processing software virtual machines and security software virtual machines as part of the present system, according to one embodiment.

Virtualization or non-virtualization security software or packet processing software is downloaded from a remote server onto an existing user's system through secured links and remote call centers for existing customers. For new users, it is preinstalled and delivered with accompanying hardware. Once the software is loaded upon initial power up, the customers' applications are downloaded on top of software on various hardware modules depending on the security applications.

The systems described herein might provide for integration of virtual and physical real time multi-core clusters systems into physical server or server virtualization environment, virtual machine awareness, implementation of security policies on various virtual machine levels or non-virtualized system levels, visibility and control of virtual machines, security and packet processing provided by a combination of virtualized software appliances and non-virtualized security software and packet processing software, end-point data protection at level of standard computer server or host, which is the source of data generation, acceleration of network traffic and security functions, open software framework for third party security software vendors, elimination of host performance penalties, and/or data security.

The present system includes distributed real-time computing capabilities integrated in a standard server platform. Distributed real time computing clusters, expanded from vertically and horizontally according to one embodiment, can be thought of as server farms, which have heterogeneous multi-core processing clusters, and server farm resources can be increased on-demand when workloads are increased. Server farm resources can be quickly activated, deactivated, upgraded or deployed.

Performance scalability of the present system is two dimensional: horizontal and vertical. The same or identical multi-core cluster function can be expanded vertically by a homogeneous architecture, and different or non-identical multi-core function can be expanded horizontal by heterogeneous architecture. Homogeneous and heterogeneous architectures are explained below in greater detail.

The present system provides for power consumption optimization. An application load driven approach provides the best power consumption utilization. Resources are enabled and disabled based on demand to follow a green energy policy.

A software programming model of the present system provides that all existing applications are not required to be rewritten and that all emerging new applications can be running transparently by using exiting APIs (application programming interface) call from existing operating systems or expanded APIs call from library supplied by third party software vendors FIG. 1 illustrates an exemplary system level layout for use with the present system, according to one embodiment. An application server (101) is running a server application (103). The application server (101) has an multitasking operating system (OS) (104), which can be from commercial products like Windows, Linux and Unix from different vendors, drivers 106, which are used to communicate between (OS) (104) and network interface cards (NIC) (110) and other hardware resources, middleware sockets (107) and middleware agents (105). The application server (101) is running a multi-core cluster (108) for server application (103), which requires packet processing or security software services, and communicates with a NIC (110) or via PCI-e (PCI Express) backplane (109). The NICs 110 provide network 111 access. The middleware sockets (107) and agents (105) are in communication with a virtualization and cloud security system (102) according to the embodiments disclosed herein.

Figure 2:
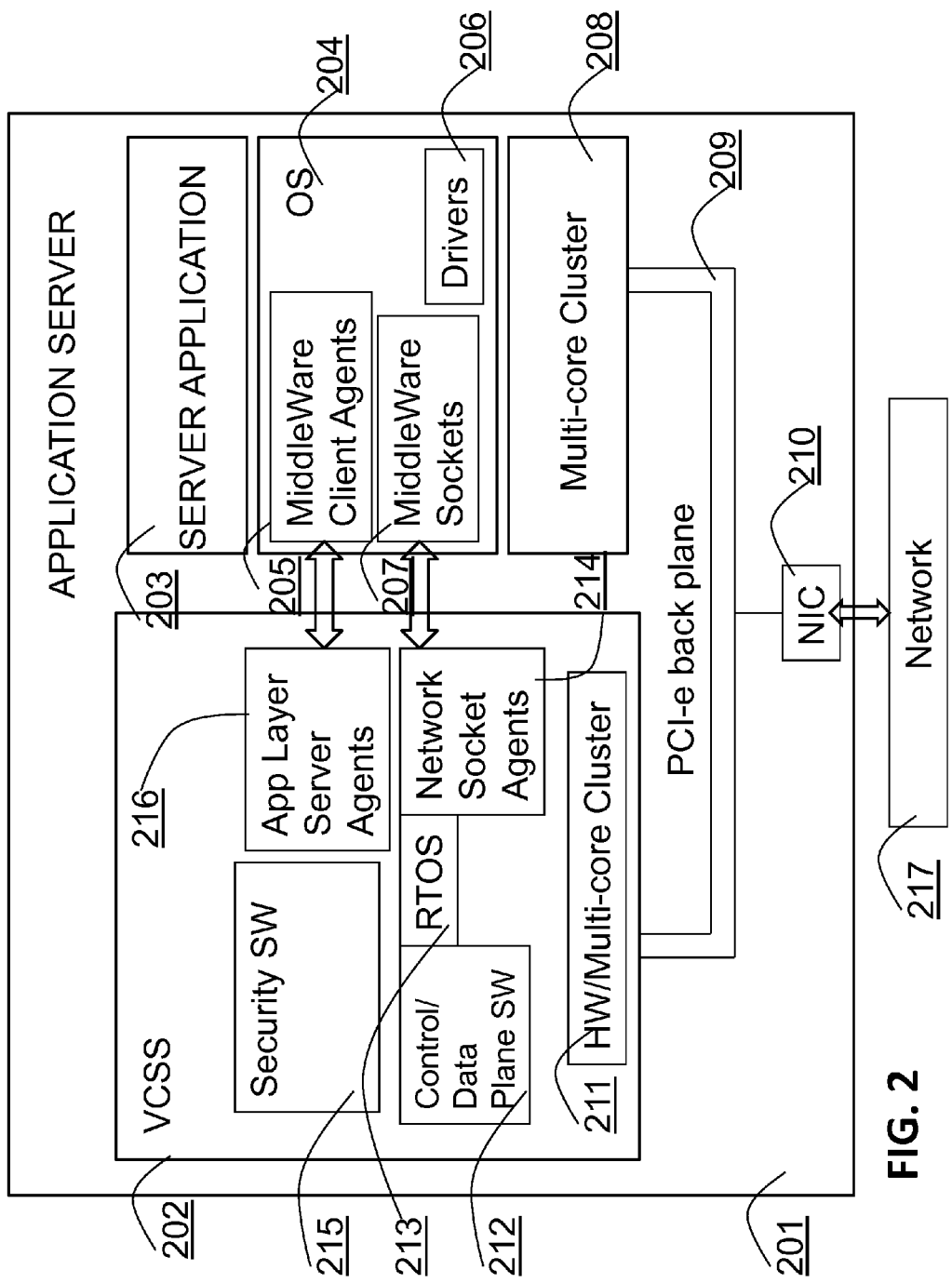
FIG. 2 illustrates an exemplary system level layout including a virtualization and cloud security architecture for use with the present system, according to one embodiment.

FIG. 2 illustrates an exemplary system level layout including virtualization and cloud security architecture for use with the present system, according to one embodiment. An application server (201) is running a server application (203). The application server 201 has an operating system (OS) 204 as described above can be any one of commercial Windows, Linux and Unix multitasking operating system, drivers (206), middleware sockets (207) and middleware agents (205). The application server (201) is running a multi-core cluster (208) for server applications. The application server (201) when requires packing processing and security functions, those requests are intercepted and serviced by a virtualization and cloud security system (VCSS) (202). The services can communicate through middleware sockets (207) and agents (205). The middleware sockets (207) and agents (205) are in communication with the virtualization and cloud security system (VCSS) 202 according to the embodiments disclosed herein. The VCSS 202, according to one embodiment, includes a hardware blade having a multi-core processing cluster (211) plugged into the PCI-e backplane (209), and a minimal software stack including network socket agents (214), a real-time operating system (213), and a control/data plane software stack (212). The VCSS 202 can also include security software support (215) and application layer server agents (216). Middleware sockets (207) and agents (205) can also communicate with application server agents (216) regarding service requests. The application server agents (216) communicate with the RTOS (213), control/data software stack (212) and network socket agent (214) to serve the request through HW/multi-core processing cluster through network interface cards (NIC) 210 or via PCI-e backplane (209). The network interface card (NIC) 210 provides network (217) access. A more detailed description of the control/data plane software stack (212) and security software stack (215) follows below.

Hardware (HW) blade/multi-core cluster (211) provides hardware for the development of an intelligent virtualization and cloud n and security system, which includes hardware and software, that supports the growing demand for intelligent network/security acceleration and application offload for converged datacenter applications such as network, storage, security, deep packet inspection (DPI), firewall, WAN Optimization, and application delivery (ADC) computing. HW/multi-core cluster 211 comprises a multi-core processor cluster (e.g., Freescale P4080QorIQ), DDR memory, flash memory, 10 Gb or 1 Gb network interfaces, mini SD/MMC card slot, a USB port, a serial console port, and a battery backed RTC. Software configuring the hardware includes a real time OS (213), i.e., real-time Linux and driver under Linux to control the hardware blocks and functions.

The multi-core cluster with security and network packet processing hardware acceleration unit in the multi-core cluster, in general, can handle appropriate functions for implementation of DPI/DDI (deep packet inspection/deep data inspection). In addition, acceleration can handle protocol processing, for example, including Ethernet, iSCSI, FC, FCoE, HTTP, SIP, and SNMP; content format includes XML, HTML/JavaScript; and pattern match includes IPS pattern and virus patterns. A more detailed description of security software (215) further follows below.

Other embodiments of the HW/multi-core cluster can include a different multi-core cluster, such as one from Cavium Networks, Netlogic and Tilera, for example, to accelerate other emerging functions. For example, the Cavium Networks Nitrox family aids in implementing other security measures and the Tilera GX family aids in implementing multimedia streaming and compression/decompression applications. While the depicted embodiment includes the PCI-e form factor, ATCA and blade center and other form factors can be used without departing from the spirit of the present system.

A real-time operating system (RTOS) (213) is an operating system (OS) intended to serve real-time application requests. A key characteristic of a RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. A RTOS that can usually or generally meet a deadline is a soft real-time OS, but if it can meet a deadline deterministically it is a hard real-time OS.

A real-time OS has an advanced algorithm for scheduling. Scheduler flexibility enables a wider, computer-system orchestration of process priorities, but a real-time OS is more frequently dedicated to a narrow set of applications. Key factors in a real-time OS are minimal interrupt latency and minimal thread switching latency. However, a real-time OS is valued more for how quickly or how predictably it can respond than for the amount of work it can perform in a given period of time. Examples of commercial real time OS include VxWorks and Linux from Windriver (Intel company) or Linux from Enea.

According to one embodiment, security software stack (215) comprises various software functions, with Table 1 illustrating examples. Table 1 provides descriptions for the modules.

TABLE 1

| Software Function | Description |
| --- | --- |
| Stateful Firewall with NAT | Controlled access to network resources. Network address translation. |
| IPSec VPN | Confidentiality, Authentication and Integrity for traffic between networks. Secure Remote Access. |
| SSLVPN | Secure Remote Access through a browser |
| IDS and IPS | Detect and prevent intrusions at L4-L7 and application level |
| Application Traffic Throttling | Detect and throttle less-priority application traffic (e.g., P2P, IM) |
| Network Anti-Virus | Stop virus infected payloads and malware from crossing the perimeter (e.g., emails, HTTP, FTP) |
| Application Firewall (HTTP/SIP) | Stop attacks/intrusions using deep data inspection of HTTP/SSL/compressed payloads |
| L4-L7 Load Balancer (ADC) | Distribute load across multiple servers. |
| Traffic Policing & Shaping | Enforce QoS policies on network/application traffic |
| Virtualization (Data Center) | Support multiple virtual security appliances within single hardware. Instances mapped to customers. |

Examples include stateful firewall with NAT (network address translation), IPSec VPN, SSLVPN, IDS (intrusion detection system) and IPS (intrusion prevention system), Application Traffic Throttling, Anti-Virus and Anti-Spyware, Application Firewall(HTTP and SIP), and packet processing functions in SW(212) and network agents (214) comprises L4-L7 load balancer, traffic policing and shaping, virtualization and cloud computing support, and support for web services, mobile devices, and social networking.

There are many third party commercial security software, for example, like Check Point Software Technologies and Trend Micro, can leverage not only the full security stack be accelerated by HW (211), control/data plane software (212), security software stack (215) and the rest of function blocks (215), (216), (214) but also seamlessly are integrated into (201) to protect the security measurements against any vulnerabilities and traffics in and out to system (201).

According to one embodiment, hardware acceleration of the security has deep packet inspection/deep data inspection (DDP/DDI). DDP/DDI enables increased deployment of advanced security functionality in system (102) with existing infrastructure without incurring new costs.

Application layer server agents (216) serve the different applications which are sent by the application client agents (205) and (207) to the application server agents (216) on behalf of application server (201) to serve those requests. The application layer server agent (216) is used by the system 102 to perform new advanced security functions which will be emerged in the future. In addition, the new real time intensive tasks, functions or services can be served by system 102 on the behalf of application server 101 to serve those requests. Once the services are requested, the application server system (201) can activate and transfer through network interface (210) or PCI-e (209) through control from middleware client agents (205) and middleware sockets (207) to application layer server agents (216) to serve on behalf of application server 201 under services from RCM application (302) in RCM software infrastructure 301 defined as follows. Once the new applications (302) require services, the new applications will be delivered to the app layer server agent (216) via the interface based on the handshaking mechanism defined in between (205) and (216) and return a desired result through software instructions (207) and interface (210) or (209) indicative of successful completion of the service to the first multi-core processing cluster.

Figure 3:
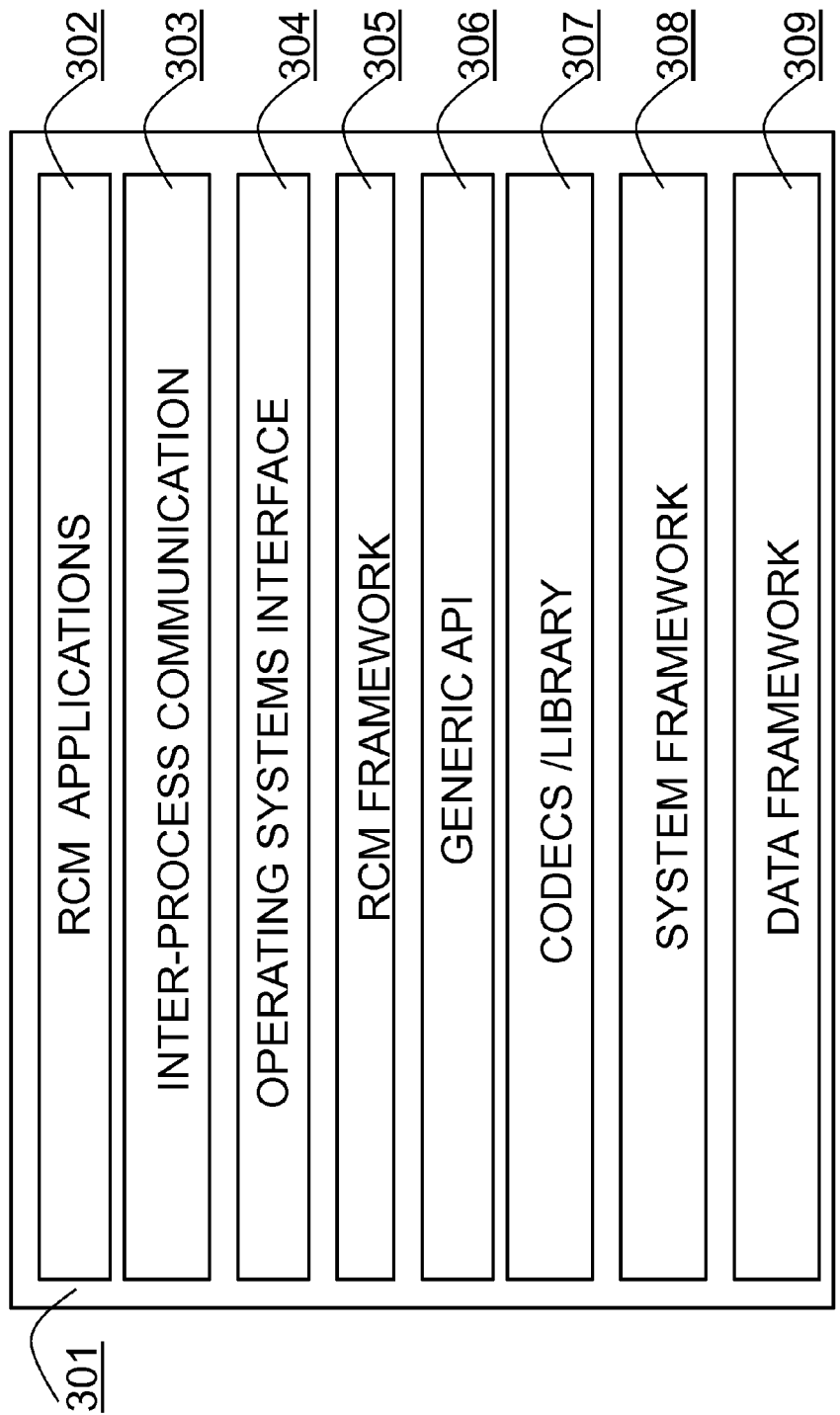
FIG. 3 illustrates an exemplary software infrastructure for use with the present system, according to one embodiment.

FIG. 3 illustrates an exemplary software infrastructure expanded from (203), (204), (205), (206) and (207) for use with the present system, according to one embodiment. An exemplary software infrastructure 301 includes support for rich content media (RCM) applications 302. The rich content media applications 302 can include security, video, imaging, audio and any combination of media(examples described herein) and embodiments described herein. The infrastructure 301 includes inter-processor communications 303 and support of various operating systems 304. The infrastructure 301 includes RCM framework 305, generic APIs 306, support for various codecs (compression/decompression) and library expansion 307, a system framework 308 and a data framework 309.

Application framework 302 can interface to any rich content multimedia applications or software services (SOA) from various sources through APIs (application programming interface). Applications can be expanded from one or more groups including network packet processing, security, security decryption/encryption, video compression/decompression, audio compression/decompression, imaging compression/decompression defined as text, audio, or video and graphics with a combination of decode and encode for remote or local sources. Encode in this case is compression technology and decode is decompression technology. The content source can be from local devices run in the server, PC or other mobile device. The content source can be remote through a LAN, WAN run from servers, web servers, application servers, data base servers in data center, or any cloud computing applications through internet access.

Newer applications, e.g., pattern recognition, can be expanded from the basic text, audio, video and imaging to run local or remote with special algorithms to encode and decode. In other words, the application framework 302 can be expanded to support the pattern recognition applications with special algorithms to compress and decompress from local servers, PCs or mobile devices or from remote cloud computing resources from internet remotely.

Inter-processor communication 303 occurs over multi-core clusters, operating systems, system interconnects and hypervisors. Inter-processor communication 303 module resides on each multi-core cluster can be used as messages communication among all different multi-core clusters identical or non-identical. Highlights of 303 include communications (IPC) through distributed messaging passing; OS, platform and interconnect independent; transparency to system scale and reconfigure without modifying codes; multiple producers and consumers; distributed inter-processing communication technology; messages based protocol or data centric distributed data services; transparent application to application connection; reliable delivery communication model; operating system independent (Windows, Linux and Unix); hardware platform independent (RISC, DSP or others).

An exemplary embodiment includes DDS as explained below for inter-processor communication. Communication standard data distribution service (DDS), enables system scalability that can support a spectrum of communication requirements, from peer to peer to vast swarms of fixed and mobile devices that have intermittent and highly variable communications profiles.

The DDS standard is particularly well-suited to distributing real-time data for logging as well as for general distributed application development and system integration. DDS specifies an API designed for enabling real-time data distribution. It uses a publish-subscribe communication model and supports both messaging and data-object centric data models. DDS offers several enhanced capabilities with respect to content-based filtering and transformation, per dataflow connectivity monitoring, redundancy, replication, delivery effort and ordering, as well as spontaneous discovery. Furthermore, DDS offers new capabilities with respect to data-object lifecycle management, best-effort and predictable delivery, delivery ordering, resource management, and status notifications.

RCM framework 305 provides core services (SOA) (service oriented architecture) for communications among applications running on 203 applications with enterprise SOA or spread across multiple real time based operating systems and processors SOA based applications running on the present system. RCM framework 305 uses communications (IPC 303) through distributed messaging passing or data centric DDS based distributed messages communication to provide SOA services to different multi-core clusters in system. It is OS, platform and interconnect independent, transparent to system scale and can reconfigure without modifying codes.

System framework 308 includes local hardware multi-core clusters and resource scheduler and management, provisioning, configuring, relocation and remote access. The multiple real-time OS configuration can support AMP (asymmetric real time multi-core multiprocessing; i.e., heterogeneous processing wherein different operating systems control different hardware clusters), SMP (symmetric real time multi-core multiprocessing; i.e., homogeneous processing wherein the same type or identical hardware multi-core clusters run under the same operating system),controlling inter-process communication between operating systems, scheduling global resources and management of clusters, handling global and local resource loading, statistics and migration, as well as providing a virtualization infrastructure interface and management of multi-core clusters.

IP-based network applications can be partitioned into three basic elements: data plane, control plane and management plane.

The data plane is a subsystem of a network node that receives and sends packets from an interface, processes them in some way required by the applicable protocol, and delivers, drops, or forwards them as appropriate. For routing functions, it consists of a set of procedures (algorithms) that a router uses to make a forwarding decision on a packet. The algorithms define the information from a received packet to find a particular entry in its forwarding table, as well as the exact procedures that the routing function uses for finding the entry. It offloads packet forwarding from higher-level processors. For most or all of the packets it receives and that are not addressed for delivery to the node itself, it performs all required processing. Similarly, for IPSec functions, a security gateway checks if a Security Association is valid for an incoming flow and if so, the data plane locally finds information to apply Security Association to a packet.

The control plane maintains information that can be used to change data used by the data plane. Maintaining this information requires handling complex signaling protocols. Implementing these protocols in data plane would lead to poor forwarding performance. A common way to manage these protocols is to let the data plane detect incoming signaling packets and locally forward them to control plane. Control plane signaling protocols can update data plane information and inject outgoing signaling packets in data plane. This architecture works because signaling traffic is a very small part of the global traffic. For routing functions, the control plane consists of one or more routing protocols that provide exchange of routing information between routers, as well as the procedures (algorithms) that a router uses to convert this information into the forwarding table. As soon as the data plane detects a routing packet, it forwards it to the control plane to let routing protocol compute new routes, add or delete routes. Forwarding tables are updated with this new information. When a routing protocol has to send a packet, it is injected in the data plane to be sent in the outgoing flow. For IPSec security functions, signaling protocols for key exchange management such as IKE or IKEv2 are located in the control plane. Incoming IKE packets are locally forwarded to control plane. When keys are renewed, Security Associations located in the data plane are updated by control plane. Outgoing IKE packets are injected in the data plane to be sent in the outgoing flow.

To provide a complete solution for next generation network applications, network packet processing today is much more complex when compared to a simple TCP/IP stack at the inception of the Internet. Refer to the description herein for the definition of control plane and data plane. High speed processing handles simple processing in a fast path or data plane. The software stack is running on the data plane which is done by multiple CPU cores to handle the data plane tasks. Complex processing is delegated to the slow path and control plane. The fast path typically is expected to integrate a large number of protocols and be designed so that adding a new protocol will not penalize the performance of the whole system.

A common network use case is made of VPN/IPSec tunnels and that aggregates Gbps of HTTP, video and audio streams. Since the L3/L7 protocols are encrypted, a data plane design which is only made of flow affinities cannot assign a specific core to each of them. It is only possible once all the pre-IPSec-processing and decryption of the payloads are complete. At each level, exceptions can happen if the packet cannot be handled at the fast path level. Implementing an additional protocol adds tests in the initial call flow and requires more instructions. The overall performance will be lower. However, there are some software design rules that can lead to an excellent trade-off between features and performance.

The management plane provides an administrative interface into the overall system. It contains processes that support operational administration, management or configuration/provisioning actions such as facilities for supporting statistics collection and aggregation, support for the implementation of management protocols, and also provides a command line interface (CLI) and/or a graphical user configuration interface, such as via a Web interface or traditional SNMP management software. More sophisticated solutions based on XML can also be implemented.

The present system supports rich content multimedia (RCM) applications. Because rich content multimedia applications consume and produce tremendous different type of data, it is very important to have a distributed data framework to be able to process, manipulate, transmit/receive, and retrieve/store all various data, for example, data, voice, audio and video today. The present system also supports other rich data types listed below and is not limited to imaging, pattern recognition, speech recognition and animation. The data type can be expanded from the basic type format and become a composition data type of multiple intrinsic data types. Where complex data type transmission and receiving requires data streams to be compressed into some certain industry standard or proprietary algorithms before transmission, the receiving end point will decompress or reconstruct the data back into its original data types and that can be done using real-time processes.

For example, video data, after being compressed with certain algorithms, can become a different data type, i.e., MPEG4 and H.264. The same applies for the audio data. Therefore, certain types of data synchronization mechanisms are required to support data reconstruction at destination.

In some traditional multimedia systems, the data types are limited by what can be efficiently processed. For example, data types might be limited to audio, video or graphics, from a single local content source to a single content destination, simple audio/video synchronization, a single content stream, etc. Typically, applications are mainly decoding, do not operate in real-time, are not interactive, don't have require synchronization at the data source, don't have reconstruction at the data destination, and don't have data type composition or data type protection. However using the present system, it can be possible to handle rich content multimedia (RCM), such as text, audio, video, graphics, animation, speech, pattern recognition, still or moving 2D/3D images, AI vision processing, handwriting recognition, security processing, etc. Data can be from multiple remote or local content sources and be for multiple remote or local content destinations. Content synchronization can be from various combinations of audio/video/data from multiple sources, with multiple content streams. Applications can encode and decode and can run in real-time, interactively, with synchronization at the data source, reconstruction at the data destination, and data type composition or data type protection.

Within a network-centric computing model, a daunting challenge is managing the distributed data and facilitating localized management of that data. An architectural approach that addresses these requirements is commonly referred to as the distributed database framework 309. The benefit of the distributed database model is that it guarantees continuous real-time availability of all information critical to the enterprise, and facilitates the design of location transparent software, which directly impacts software module reuse.

Software applications gain reliable, instant access across dynamic networks to information that changes in real-time. The architecture uniquely integrates peer-to-peer Data Distribution Service networking, and real-time, in-memory database management systems (DBMS) into a complete solution that manages storage, retrieval, and distribution of fast changing data in dynamically configured network environments. It guarantees continuous availability in real-time of all information that is critical to the enterprise. DDS technology is employed to enable a truly decentralized data structure for distributed database management while DBMS technology is used to provide persistence for real-time DDS data.

According to one embodiment, embedded applications do not need to know SQL or OBDC semantics and enterprise applications are not forced to know publish-subscribe semantics. Thus, the database becomes an aggregate of the data tables distributed throughout the system.

When a node updates a table by executing a SQL INSERT, UPDATE, or DELETE statement on the table, the update is proactively pushed to other hosts that require local access to the same table via real-time publish-subscribe messaging. This architectural approach enables real-time replication of any number of remote data tables.

Figure 4:
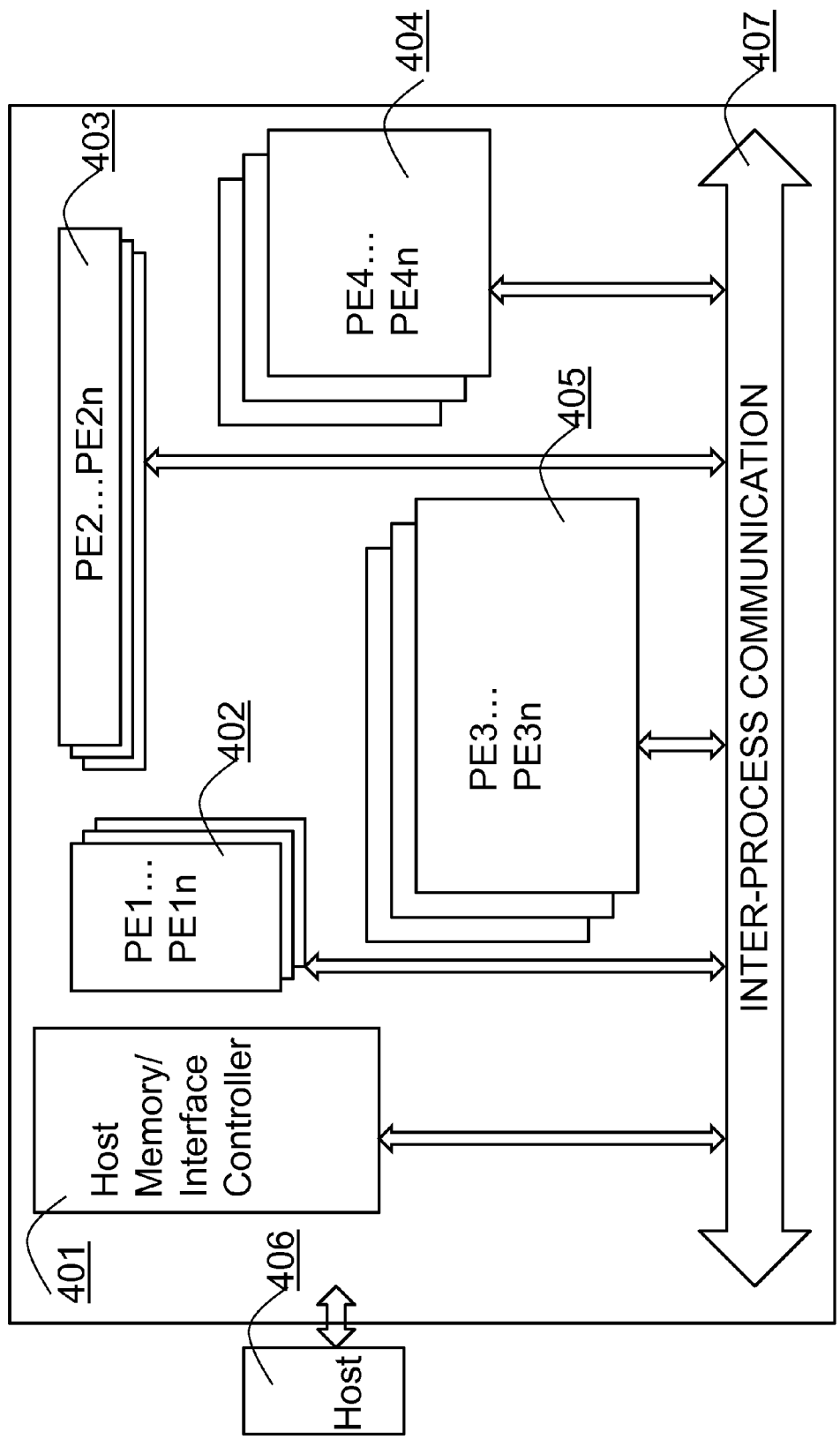
FIG. 4 illustrates an exemplary hardware infrastructure for use with the present system, according to one embodiment.

FIG. 4 illustrates an exemplary hardware infrastructure for use with the present system, according to one embodiment. A host 406 is in communication with various clusters via a host and memory interface 401. In FIG. 1, the host might be system 101 without system 102. The host can, in general, refer to a standard server platform. The host commonly has multi-core cluster and multi-tasking OS to control. The hardware infrastructure includes clusters of one or more multi-core processing elements (PEs) running the real-time operating system and applications, PE1 402, PE2 403, PE3 405, and PE4 404. Processing elements communicate through inter-process communication 407. The examples of host multi-core cluster (406) can refer to x86 multi-core cluster from Intel and AMD, PowerPC multi-core cluster from IBM and its licensed companies, ARM multi-core cluster and its licensed companies. The examples of multitasking OS can refer to Windows, Linux and Unix from various companies.

To integrate the description of the exemplary hardware infrastructure, we refer back to the hardware blade described above. Each hardware blade can include a cluster of, for example, FreescaleQorIQ 4080 (has 8 CPUs inside one IC package) or more clusters depending on the package density of hardware blade. In general, one FreescaleQorIQ 4080 (as an example) cluster corresponds to one cluster of processing elements of hardware infrastructure in FIG. 4 (e.g., PE1 . . . PE18).

If two hardware blades are installed and each blade has the same type of multi-core cluster (e.g., FreescaleQorIQ 4080), it is called homogeneous expansion. In another embodiment, the hardware blade has the capacity to include more than one cluster in one blade.

If two hardware blades are installed and the first blade has FreescaleQorIQ 4080 and the second blade has Cavium Network cluster OCTEON II CN68XX, the Freescale cluster corresponds to PE1 . . . PE18 and the Cavium cluster corresponds to PE2 . . . PE216 (assuming the use of 16 cores). The two hardware blades have non-identical multi-core clusters and it is called heterogeneous expansion.

Host 406 is a standard server, representing an x86 based cluster. It can perform server applications. For example, it can represent applications server, web server or database server. It can run all general purpose applications, I/O function and network function services and calls and other system related tasks for OS.

Figure 5:
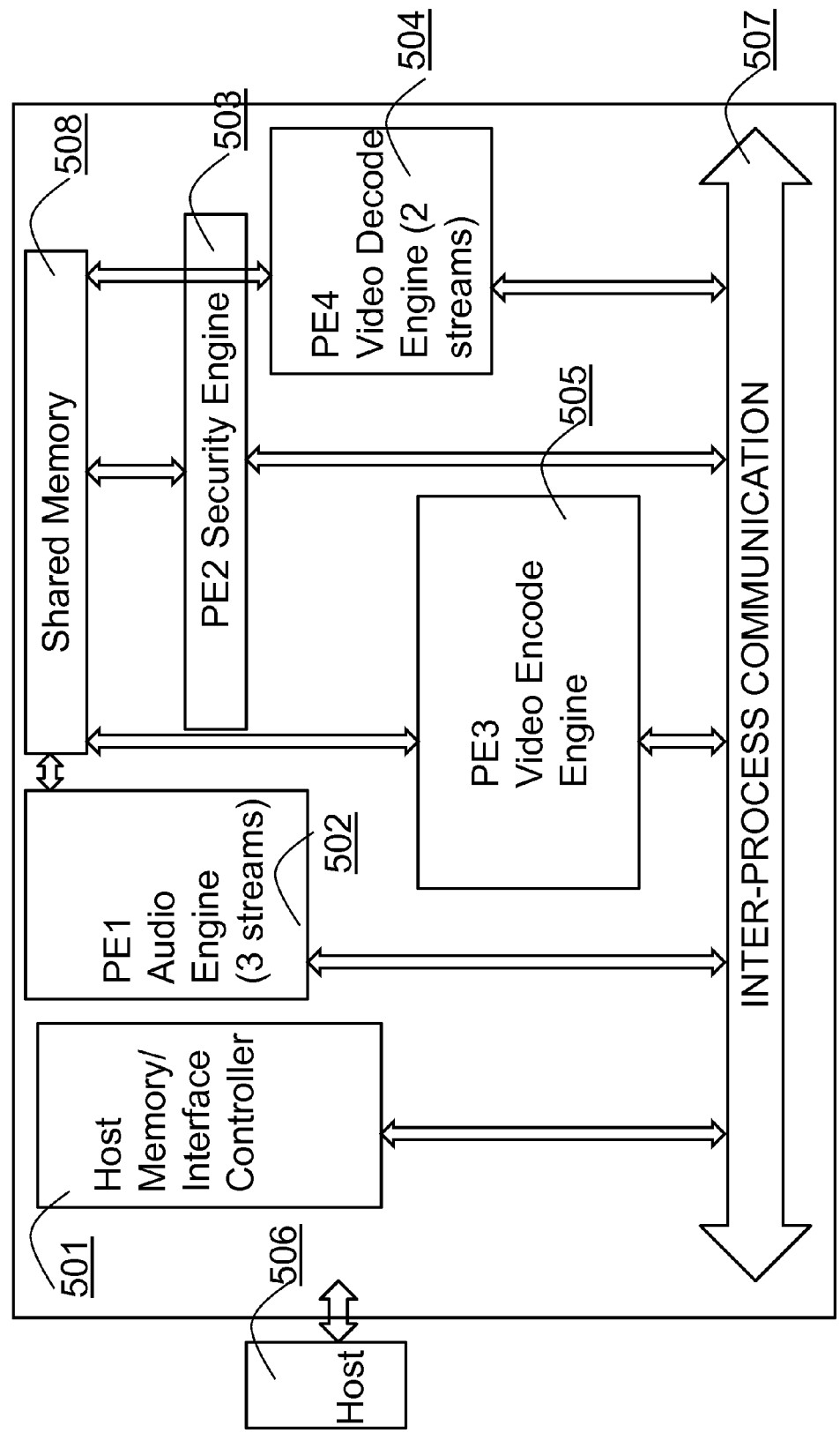
FIG. 5 illustrates an exemplary hardware infrastructure implementation for use with the present system, according to one embodiment.

FIG. 5 illustrates an exemplary hardware infrastructure implementation for use with the present system, according to one embodiment. A host 506 is in communication with various clusters via a host and memory interface 501. The hardware infrastructure includes clusters of one or more processing elements running the same operating system and application. In this example, PE1 is an audio engine running three audio streams 502, PE2 is a security engine 503, PE3 is a video encode engine 505, and PE4 is a video decode engine 504 running two video streams. Processing elements communicate through inter-process communication 507 and have a shared memory 508.

Figure 6:
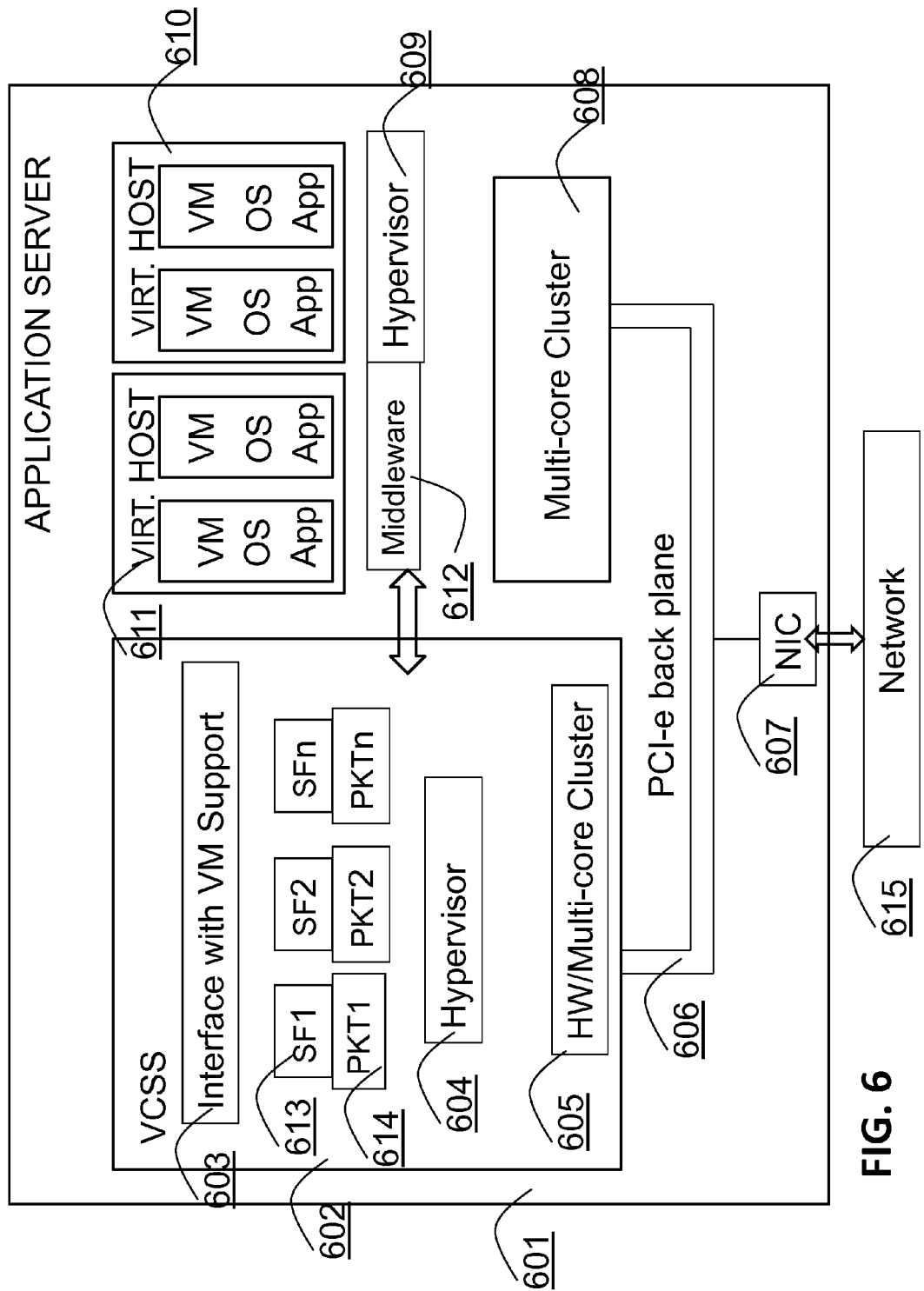
FIG. 6 illustrates an exemplary system level layout with virtualization support for use with the present system, according to one embodiment.

FIG. 6 illustrates an exemplary system level layout with virtualization support for use with the present system, according to one embodiment. An application server 601 includes one or more virtual hosts, which are virtualized as virtual machines, called virtual hosts 610 and 611. Virtual hosts 610 and 611 are virtual machines (VM) including operating systems (OS) and applications (App). Middleware 612 communicates with the VCSS 602 and a hypervisor 609 and real-time hypervisor 604 handle resource scheduling and allocation. The server 601 is running a virtual machine on multi-core cluster 608 and requesting for packet and/or security application processing. The multi-core cluster 608 communicates with a network interface cards (NIC) 607 or via PCI-e backplane 606. The network interface cards (NIC) 607 provides network 615 access. VCSS 602 includes a hardware blade having a multi-core cluster 605 (HW/Multi-Core), a real-time hypervisor 604 for scheduling and allocating resources, an interface with virtual machine support 603, and several security virtual machine functions (SF1, SF2, . . . , SFn) 613 and packet processing virtual machine functions (PKT1, PKT2, . . . , PKTn) 614.

Hypervisor 609, also referred to as a virtual machine manager (VMM), allows multiple operating systems, termed guests, to run concurrently on a host computer. It is so named because it is conceptually one level higher than a supervisory program. The hypervisor presents to the guest operating systems a virtual operating platform and manages the execution of the guest operating systems. Multiple instances of a variety of operating systems may share the virtualized hardware resources. Hypervisors are installed on server hardware whose task is to run guest operating systems. Non-hypervisor virtualization systems are used for similar tasks on dedicated server hardware, but also commonly on desktop, portable and even handheld computers.

Examples of a host hypervisor 609 include products offered by VMware, Citrix and Microsoft.

Embedded hypervisor 604 is a real time based hypervisor. The embedded hypervisor is used in the real-time embedded virtualization. It allows developers to leverage multiple real-time operating systems in a single device so they can expand and enhance device functionality; it facilitates the adoption of multi-core clusters by increasing reliability and reducing risk; and it provides the new software configuration options required to architect next-generation embedded devices. Examples of embedded hypervisors on the hardware blade include products offered by Windriver and Green Hills Software.

Several security virtual machine functions SF1, SF2, . . . , SFn (613) and packet processing virtual machine functions PKT1, PKT2, . . . , PKTn (614) and all other real time based virtual machines are sharing the HW/multi-core cluster 605. Since they are in software instances form, they can be stored in the local memory in HW/multi-core cluster 605 during the idle state and activated by the embedded hypervisor 604. In addition, the hypervisor 609 running in the application server 601 can activate the SF1 . . . SFn or PKT1 . . . PKTn virtual machines on behalf of the virtual machines running 610 and/or 611. When virtual machine 611 or 610 requires the functions of network 615 access to and from NIC 607, the middleware 612 converts the service requests for the interface 603. After interface 603 receives the requests, it invokes the PKT1 . . . PKTn (614) to service the network access request. Same situation applies to security virtual machines SF1 . . . SFn (613). If virtual machine 611 or 610 requires the services of security functions, the middleware 612 converts the request for the interface 603. Interface 603 then reacts like a server to serve the security requests by invoking virtual machines SF1 or SF2 . . . SFn. Once services are completed, the results are returned to virtual machine 611 or 610 through 612. An application server VCSS (601) can be further expanded as by items (604) and (605) into multi-core clusters according to one embodiment listed above. SF1 . . . SFn or PKT1 . . . PKTn virtual machines can be also further expanded to other real-time virtual machines for RCM applications listed above.

According to one embodiment, a cloud based architecture provides a model for cloud security consisting of a service oriented architecture (SOA) security layer that resides on top of a secure virtualized runtime layer. A cloud delivered services layer is a complex, distributed SOA environment. Different services are spread across different clouds within an enterprise. The services can reside in different administrative or security domains that connect together to form a single cloud application. An SOA security model fully applies to the cloud. A web services (WS) protocol stack forms the basis for SOA security and, therefore, also for cloud security.

One aspect of an SOA is the ability to easily integrate different services from different providers. Cloud computing is pushing this model one step further than most enterprise SOA environments, since a cloud sometimes supports a very large number of tenants, services and standards. This support is provided in a highly dynamic and agile fashion, and under very complex trust relationships. In particular, a cloud SOA sometimes supports a large and open user population, and it cannot assume an established relationship between a cloud provider and a subscriber.

It should be understood by one having ordinary skill in the art that the present system is not limited to an implementation having the presently disclosed multi-core cluster configuration and that embodiments including any appropriate substitute achieve the present objective.

It should be understood by one having ordinary skill in the art that the present system is not limited to an implementation having security software applications, and that embodiments including audio compression/decompression, video compression/decompression, imaging compression/decompression, speech compression/decompression or any appropriate substitute of RCM (rich content multimedia) to achieve the present objective.

In the description above, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A system and method for virtualization and cloud security are disclosed. Although various embodiments have been described with respect to specific examples and subsystems, it will be apparent to those of ordinary skill in the art that the concepts disclosed herein are not limited to these specific examples or subsystems but extends to other embodiments as well. Included within the scope of these concepts are all of these other embodiments as specified in the claims that follow.

I claim:

1. A system, comprising:
a first set of multi-core processing clusters physically coupled to a hardware backplane, the first set of multi-core processing clusters comprising one or more first hardware clusters with identical first instruction sets, the first set of multi-core processing clusters configured to run a multitasking operating system and execute software instructions under the multitasking operating system;
a second set of multi-core processing clusters physically coupled to the hardware backplane, the second set of multi-core processing clusters and the first set of multi-core processing clusters capable of communication via the hardware backplane, the second set of multi-core processing clusters comprising one or more second hardware clusters with identical second instruction sets, the identical second instructions sets different from the identical first instruction sets, the second set of multi-core processing clusters configured to run a real-time operating system, the real-time operating system configured to execute the software instructions under the real-time operating system;
a first set of software agents configured to execute under the real-time operating system to (i) receive multiple real-time processing requests in response to execution of at least a portion of the software instructions under the real-time operating system, the multiple real-time processing requests intercepted from servicing on the first set of multi-core processing clusters by a second set of software agents executing under the multitasking operating system, (ii) service the multiple real-time processing requests, and (iii) return results of the servicing to the second set of software agents via the hardware backplane;
software application layer server agents and network socket agents executing in the second set of multi-core processing clusters and serving multiple services upon a request from middleware client agents and middleware sockets executing in the first set of multi-core processing clusters;
wherein the middleware sockets and the middleware client agents communicate with the software application layer server agents and the network socket agents via the hardware backplane for execution of one or more services, software applications, or virtual machines in real-time software stacks of the second set of multi-core processing clusters or virtual machine stacks of the second set of multi-core processing clusters, and
wherein execution results of the one or more services, software applications, or virtual machines are sent back to the middleware client agents and the middleware sockets via the hardware backplane.

2. The system of claim 1, further comprising one or more real-time hypervisors configured to coordinate multiple instruction sets of multi-core processing clusters to allocate multiple real-time virtual machines for services by intercepting requests by the first set of multi-core processing clusters using the second set of software agents and return execution results of the multiple real-time virtual machines using the first set of software agents to the first set of multi-core processing clusters via the hardware backplane.

3. The system of claim 1, wherein the first set of multi-core processing clusters are managed by multitasking hypervisors, and the second set of multi-core processing clusters are managed by real-time operating systems or by real-time hypervisors.

4. The system of claim 1, further comprising:
the software application layer server agents and the network socket agents serving new real-time applications or new real-time virtual machines sent by the middleware client agents and the middleware sockets, any of the middleware sockets or the middleware client agents communicating with the software application layer server agents and the network socket agents for execution of the new real-time applications or the new real-time virtual machines in more than one real-time software stacks or virtual machine stacks in the second set of multi-core processing clusters; and wherein the execution results of the new services, the new applications or the new virtual machines are sent back to the middleware client agents and the middleware sockets in the first set of multi-core processing clusters via the hardware backplane.

5. The system of claim 1, wherein the execution of the software applications in the real-time software stacks, or the execution of the virtual machines in the real-time virtual machine stacks, can further include one or more sets of control and/or data plane software stacks executing one or more sets of real-time software applications or virtual machines including any of packet processing functions, application throttling functions, code analysis functions, load balancer functions between L4 and L7, traffic policies and shaping functions, QoS functions, VLAN functions, Link Aggregation functions, GRE encapsulation functions, GTP and IP over IP tunneling functions, Layer 3 forwarding with virtual routing management functions, routing and virtual routing and Filtering (ACLs) software functions.

6. The system of claim 1, further comprising:
real-time software applications or virtual machine software, stored in memories or computer readable storage mediums, wherein the real-time software applications or virtual machine software are executed in one or more sets of security software stacks or virtual machines software stacks in the second set of multi-core processing clusters;
one or more sets of control and/or data plane software stacks executing one or more sets of software applications or virtual machines including any of:
security functions, stateful firewalls with network address translation functions, IPSec VPN functions, SSLVPN functions, intrusion detection functions, intrusion prevention functions, anti-virus functions, anti-spyware functions, and application firewalls HTTP or SIP functions.

7. The system of claim 1, wherein the second set of multi-core processing clusters comprises a plurality of distinct instruction sets of hardware clusters and a plurality of distinct type of real-time software application stacks, with at least two distinct instruction sets of hardware clusters optimized for distinct type of real-time software application stacks executing for distinct type of real-time applications or virtual machines.

8. The system of claim 7, wherein the distinct type of real-time application software stacks with distinct type of applications or virtual machines executing comprise one or more sets of image processing applications, cryptographic processing applications, video compression processing applications, video decompression processing applications, and pattern recognition processing applications.

9. The system of claim 7, wherein the second set of multi-core processing clusters further comprises a plurality of distinct instruction sets and a plurality of distinct application software stacks for software application execution and virtual machines, the identical first instruction sets including a plurality of hardware clusters and more than one application software stack for software applications or virtual machines execution.

10. A method comprising:
executing software instructions in first multi-core processing clusters under control of multitasking operating systems, each of the first multi-core processing clusters comprising one or more hardware clusters with identical first instruction sets, each of the first multi-core processing clusters configured to run an identical one of the multitasking operating systems and execute the software instructions under a respective one of the multitasking operating systems, each of the first multi-core processing clusters physically coupled to a hardware backplane;
executing the software instructions in second multi-core processing clusters under control of real-time operating systems, each of the second multi-core processing clusters comprising one or more hardware clusters having associated identical second instruction sets, the identical second instruction sets being different from the identical first instructions sets, each of the second multi-core processing clusters configured to run one of the real-time operating systems and execute the software instructions under a respective one of the real-time operating systems, each of the second multi-core processing clusters physically coupled to the hardware backplane, the first multi-core processing clusters and the second multi-core processing clusters capable of communication via the hardware backplane;
executing a first set of software agents in the second multi-core processing clusters, the first set of software agents configured to (i) receive multiple real-time function processing requests in response to execution of at least a portion of the software instructions under the real- time operating systems, the multiple real-time function processing requests intercepted from servicing on the first multi-core processing clusters by a second set of software agents executing in the first multi-core processing clusters, (ii) service the real-time function processing requests, and (iii) return results of the servicing to the second set of software agents executing in the first multi-core processing clusters via the hardware backplane;
executing software application layer server agents and network socket agents in the second multi-core processing clusters, and serving multiple services upon a request form middleware client agents and middleware sockets executing in the first multi-core processing clusters;
wherein the middleware client agents and the middleware sockets communicate with the software application layer server agents and the network socket agents for execution of one or more services, applications or virtual machines in real-time software stacks or virtual machine stacks, and
returning execution results of the one or more services, applications or virtual machines to the middleware client agents and the middleware sockets via the hardware backplane.

11. The method of claim 10, further comprising:
coordinating, by real-time hypervisors, multiple instruction sets of the second multi-core processing clusters to allocate multiple real-time virtual machines for services based on intercepting requests by the first multi-core processing clusters using the second set of software agents; and returning execution results of multiple real-time virtual machines, using the first set of software agents, to the first multi-core processing clusters via the hardware backplane.

12. The method of claim 10, wherein the first multi-core processing clusters with instruction sets are managed by multitasking hypervisors, and the second multi-core processing clusters are managed by real-time operating systems or by real-time hypervisors.

13. The method of claim 10, further comprising:
executing identical or non-identical software application layer server agents and network socket agents in the second multi-core processing clusters;
serving new services, new real-time applications, or new real-time virtual machines sent by the middleware client agents and the middleware sockets to the second multi-core processing clusters executing in the real-time software stacks or the virtual machine stacks; and
returning execution results of the new services, the new real-time applications, or the new real-time virtual machines from the second multi-core processing clusters to the middleware client agents and the middleware sockets of the first multi-core processing clusters via the hardware backplane.

14. The method of claim 10, wherein the execution of software applications in real-time application software stacks or the execution of virtual machines in real-time virtual machine stacks includes one or more sets of control and/or data plane software stacks executing one or more sets of packet processing functions, application throttling functions, code analysis functions, load balancer functions between L4 and L7, traffic policies and shaping, QoS functions, VLAN functions, Link Aggregation functions, GRE encapsulation functions, GTP and IP over IP tunneling functions, Layer 3 forwarding with virtual routing management functions, routing and virtual routing and Filtering (ACLs) software functions in the second multi-core processing clusters.

15. The method of claim 10, wherein the software applications or the virtual machines, stored in memories or computer readable storage mediums, are executing in one or more sets of security software stacks or virtual machine stacks in the second multi-core processing clusters, can further have one or more set of control and/or data plane software stacks executing one or more sets of security software functions, firewall functions, stateful firewall processing with network address translation functions, and application firewalls HTTP or SIP functions.

16. The method of claim 15, wherein the software applications or the virtual machines stored in memories or computer readable storage mediums running in one or more sets of security software application software stacks or virtual machines software stacks, further comprise functions and:
initiating IPSec virtual private network functions;
executing SSLVPN functions;
handling intrusion detection and/or prevention functions in real-time;
executing anti-virus functions in real-time;
executing anti-spyware functions in real-time.

17. The method of claim 10, wherein the second multi-core processing clusters further comprise a plurality of distinct instruction sets of hardware clusters and a plurality of distinct type of real-time software application stacks, with at least two distinct instruction sets of hardware clusters optimized for distinct type of real-time application software stacks executing for distinct type of real-time applications or virtual machines.

18. The method of claim 17, wherein the distinct type of real-time application software stacks with distinct type of applications or virtual machines executing comprise one or more sets of image processing applications, cryptographic processing applications, video compression processing applications, video decompression processing applications, and pattern recognition processing applications.

19. The method of claim 10, further comprising executing a plurality of real-time software applications or virtual machines using the second multi-core processing clusters.

20. A non-transitory computer readable medium comprising executable instructions, the instructions being executable by a processor to perform a method comprising:
executing software instructions in first multi-core processing clusters under control of multitasking operating systems, each of the first multi-core processing clusters comprising one or more hardware clusters with identical first instruction sets, each of the first multi-core processing clusters configured to run an identical one of the multitasking operating systems and execute the software instructions under a respective one of the multitasking operating systems, each of the first multi-core processing clusters physically coupled to a hardware backplane;
executing the software instructions in second multi-core processing clusters under control of real-time operating systems, each of the second multi-core processing clusters comprising one or more hardware clusters having associated identical second instruction sets, the identical second instruction sets being different from the identical first instructions sets, each of the second multi-core processing clusters configured to run one of the real-time operating systems and execute the software instructions under a respective one of the real-time operating systems, each of the second multi-core processing clusters physically coupled to the hardware backplane, the first multi-core processing clusters and the second multi-core processing clusters capable of communication via the hardware backplane;
executing a first set of software agents in the second multi-core processing clusters, the first set of software agents configured to (i) receive multiple real-time function processing requests in response to execution of at least a portion of the software instructions under the real-time operating systems, the multiple real-time function processing requests intercepted from servicing on the first multi-core processing clusters by a second set of software agents executing in the first multi-core processing clusters (ii) service the real-time function processing requests, and (iii) return results of the servicing to the second set of software agents executing in the first multi-core processing clusters via the hardware backplane;
executing software application layer server agents and network socket agents in the second multi-core processing clusters, and serving multiple services upon a request from middleware client agents and middleware sockets executing in the first multi-core processing clusters;
wherein the middleware client agents and the middleware sockets communicate with the software application layer server agents and the network socket agents for execution of one or more services, applications or virtual machines in real-time software stacks or virtual machine stacks, and returning execution results of the one or more services, applications or virtual machines to the middleware client agents and the middleware sockets via the hardware backplane.

\* \* \* \* \*